No. 710,490. Patented Oct. 7, 1902.
H. S., A. P. & W. F. MILLER.
FLEXIBLE PARTITIONS AND MEANS FOR OPERATING THEM.
(Application filed Oct. 7, 1901.)
(No Model.)
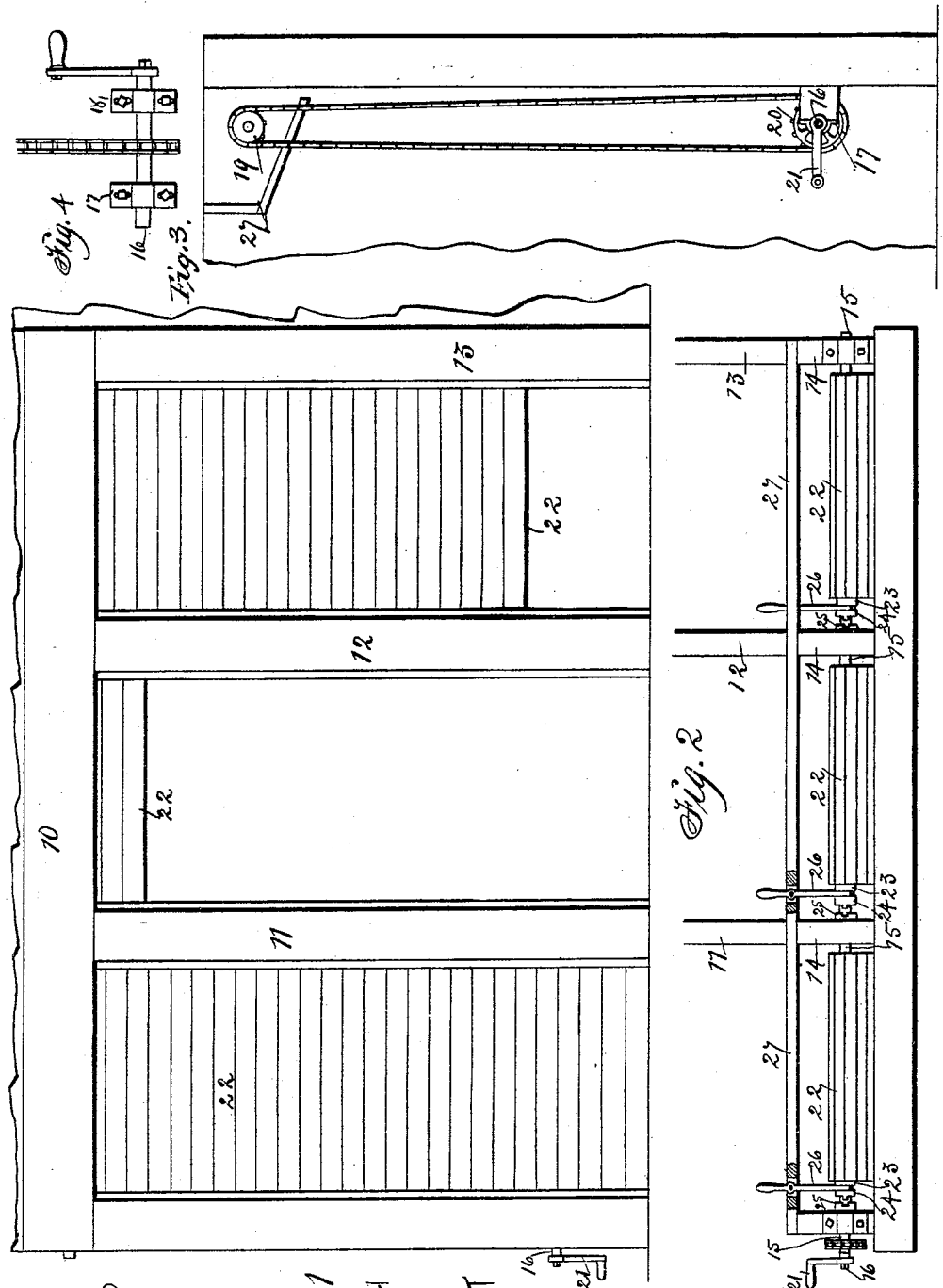

UNITED STATES PATENT OFFICE.

HARRY S. MILLER AND ARTHUR P. MILLER, OF DALLAS CENTER, IOWA, AND WORTH F. MILLER, OF KENMARE, NORTH DAKOTA.

FLEXIBLE PARTITIONS AND MEANS FOR OPERATING THEM.

SPECIFICATION forming part of Letters Patent No. 710,490, dated October 7, 1902.

Application filed October 7, 1901. Serial No. 77,789. (No model.)

*To all whom it may concern:*

Be it known that we, HARRY S. MILLER and ARTHUR P. MILLER, residents of Dallas Center, Dallas county, State of Iowa, and WORTH F. MILLER, a resident of Kenmare, in the county of Ward and State of North Dakota, all citizens of the United States, have invented a new and useful Improvement in Flexible Partitions in Buildings and Means for Operating Them, of which the following is a specification.

Our object is to connect a plurality of flexible partitions with an equal number of rooms in a building and a rotatable shaft in such a manner that any one of the partitions or any number of them less than all can be raised and lowered independently and also in such a manner that all the partitions can be raised and lowered simultaneously by rotating the shaft.

Our invention consists in the construction, arrangement, and combination of a rotatable shaft, means for rotating the shaft, and a plurality of flexible partitions, with a fixed wall, as hereinafter set forth, pointed out in the claim, and illustrated in the accompanying drawings, in which—

Figure 1 is a front view of a fixed wall in which are openings that communicate with rooms in rear of the wall, and two of said rooms are closed by flexible partitions. Fig. 2 is a top view of the fixed wall, fixed partitions extending at right angles from the fixed wall, a rotatable shaft, and flexible partitions connected with the rotatable shaft. Fig. 3 is an end view of the fixed wall and the mechanism combined therewith and with the rotatable shaft as required for operating the shaft and flexible partitions adjustably connected with the fixed wall and the rotatable shaft. Fig. 4 is a detail view showing a shaft mounted in adjustable bearings for operating a chain on sprocket-wheels as required for rotating the main shaft, to which the curtains are detachably fastened.

The numeral 10 designates the fixed wall, and 11, 12, and 13 are fixed partitions extending at right angles to the fixed wall as required to produce a plurality of rooms behind the fixed wall 10. Shaft-bearings 14 are fixed to the rear of the wall above the openings communicating with the rooms, and a rotatable shaft 15 is mounted in said bearings. A rotatable shaft 16 is mounted in adjustable bearings 17 and 18 at the end and lower portion of the fixed wall 10, as shown in Fig. 3, or in any suitable way, so that the shaft 16 can be raised or lowered relative to the shaft 15 as required to regulate the tension of a chain on sprocket-wheels 19 and 20, fixed to said shafts. A crank-handle 21 on the short shaft 16 serves as a means for rotating the shafts as required for raising and lowering flexible partitions connected with the shaft 15.

The flexible partitions 22 are fixed to tubes 23 at their top ends, and the tubes have clutch members 24 at one end adapted to engage corresponding clutch members 25, fixed to the shaft 15.

To move the tubes 23 longitudinally, as required to lock them to the shaft 15 by means of the clutch members 24 and 25, levers 26 are fulcrumed to a cover 27, fixed to the bearings 14 and connected with the clutch members 24 on the tubes 23, to which the flexible partitions 22 are fixed in such a manner that the clutch members can be readily connected and disconnected at pleasure and as required for lifting and lowering one or more or all the flexible partitions by means of the rotatable shaft 15.

It is obvious the flexible partitions may be made of wooden slats fixed to a flexible fabric or in any suitable way, so they can be rolled on the rotatable shaft as required to elevate them to open the rooms in rear of them. It is also obvious that any number of rooms can be thus provided with flexible partitions that can be raised and lowered separately or all together by simply rotating the shaft with which the partitions are connected.

We are aware curtains have been mounted on shafts in bearings at the tops of windows in such a manner that the shafts could be connected and jointly rotated and the curtains raised and lowered singly or jointly; but in no instance have flexible partitions been fixed to tubes slidably mounted on a single rotatable shaft and each tube provided with a clutch member at one end to engage a mating clutch member fixed on the shaft, so that each partition could be raised and lowered independently while the others remained elevated and stationary and also in such a manner that a plurality of the partitions or all of them raised and lowered simultaneously, as contemplated by our invention.

Having thus described our invention and manner of operation, its practical utility will be readily understood by persons familiar with the art to which it pertains, and

What we claim as new, and desire to secure by Letters Patent, is—

In a building, a straight rotatable shaft mounted in bearings fixed at the top portions of partitions between a plurality of rooms, clutch members fixed to the shaft at one side of each partition, tubes slidingly mounted on the shaft to extend between the partition-walls of each room, a clutch member on one end of each tube, a flexible partition fixed to each tube, means for sliding, independently, each tube, and means for rotating the shaft, arranged and combined to operate in the manner set forth for the purposes stated.

HARRY S. MILLER.
ARTHUR P. MILLER.
WORTH. F. MILLER.

Witnesses:
S. A. SUMNER,
GERALD GRIFFIN WALKER.